(12) United States Patent
Pratt

(10) Patent No.: US 6,736,272 B2
(45) Date of Patent: *May 18, 2004

(54) SYSTEM AND METHOD FOR RECYCLING IDENTIFICATION TAGS

(75) Inventor: William C. Pratt, Christiansted (VG)

(73) Assignee: Micro Beef Technologies, Ltd., Amarillo, TX (US)

(*) Notice: Subject to any disclaimer, the term of this patent is extended or adjusted under 35 U.S.C. 154(b) by 92 days.

This patent is subject to a terminal disclaimer.

(21) Appl. No.: 10/037,034

(22) Filed: Jan. 2, 2002

(65) Prior Publication Data

US 2002/0056669 A1 May 16, 2002

Related U.S. Application Data

(63) Continuation of application No. 09/512,144, filed on Feb. 23, 2000, which is a continuation of application No. 08/850,245, filed on May 2, 1997, now Pat. No. 6,131,744.

(51) Int. Cl.[7] .................................................. B07C 5/00
(52) U.S. Cl. ............................................ 209/559; 209/583
(58) Field of Search ................................. 209/540, 552, 209/559, 562, 563, 564, 577, 583, 919, 937; 119/51.02, 502, 511

(56) References Cited

U.S. PATENT DOCUMENTS

| | | | |
|---|---|---|---|
| 3,415,372 A | 12/1968 | Drace | 209/937 X |
| 3,648,838 A | 3/1972 | Hiromura | 209/583 X |
| 4,144,970 A | 3/1979 | McKnight et al. | 209/542 |
| 4,208,009 A | 6/1980 | Markkanen et al. | 209/583 X |
| 4,356,613 A | 11/1982 | Nelson | 29/407.1 |
| 4,597,495 A | 7/1986 | Knosby | 209/583 X |
| 4,907,699 A | 3/1990 | Butcher et al. | 209/583 X |
| 5,419,442 A | 5/1995 | Wright, Jr. | 209/682 |
| 5,478,990 A * | 12/1995 | Montanari et al. | 235/375 |
| 5,513,264 A | 4/1996 | Wang et al. | 209/548 X |
| 5,590,791 A | 1/1997 | Gschweitl | 209/577 |
| 5,746,323 A | 5/1998 | Dragotta | 209/539 |
| 6,131,744 A | 10/2000 | Pratt | 209/540 |
| 6,231,435 B1 * | 5/2001 | Pilger | 452/157 |
| 6,318,289 B1 * | 11/2001 | Pratt | 119/51.02 |

FOREIGN PATENT DOCUMENTS

| | | | |
|---|---|---|---|
| JP | 2-46900 | 2/1990 | 209/937 |
| JP | 2-193813 | 7/1990 | |

OTHER PUBLICATIONS

Standard Transponders Specifications, Texas Instruments Data Sheet 22–22–026, 13 pages (Dec. 1992).

* cited by examiner

Primary Examiner—Donald P. Walsh
Assistant Examiner—Tuan Nguyen
(74) Attorney, Agent, or Firm—Klarquist Sparkman, LLP

(57) ABSTRACT

A recycling system particularly useful for using, sorting and reusing large quantities of animal identification tags for use by producers, feedlots and packing plants is described. In one aspect of the invention, a plurality of unsorted, previously used and cleaned identification tags are passed through a tag aligner that aligns the tags in series. The aligned tags are fed to a tag sorter that includes a plurality of sorting bins for storing the sorted tags. A tag reader reads the identification tags and passes identification information stored on the tags to a controller. The controller analyzes the identification information from the tags and determines in which one of the sorting bins each tag should be stored. When each tag is adjacent the proper sorting bin, the controller signals the sorter to eject the tag into such bin. After sorting, the tags are redistributed to their original users for reuse. After reuse by a producer and/or feedlot and packing plant, the cleaning, sorting and redistribution process is repeated. The system and method provides an economical and practical way to correlate live animal data and carcass data for large numbers of animals on an individual animal basis.

4 Claims, 8 Drawing Sheets

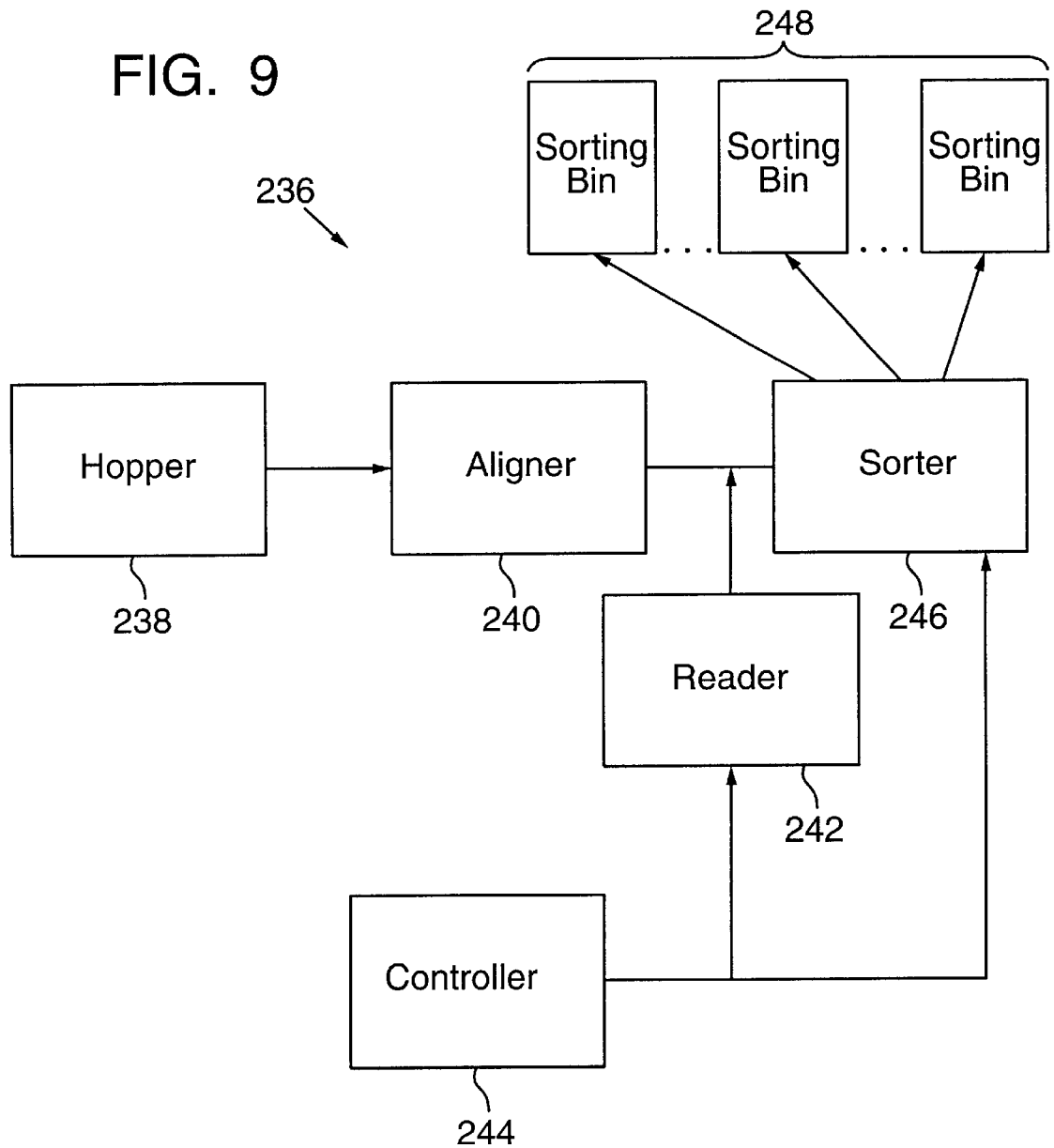

SYSTEM AND METHOD FOR RECYCLING IDENTIFICATION TAGS

RELATED APPLICATION

This application is a continuation of U.S. patent application Ser. No. 09/512,144, which is a continuation of U.S. patent application Ser. No. 08/850,245, filed May 2, 1997, now U.S. Pat. No. 6,131,744.

FIELD OF THE INVENTION

The present invention concerns a system and method for sorting articles having electronic information stored thereon, especially for reuse, and particularly electronic animal identification tags that are used to track animals in feedlots and packing plants, such that the tags can be returned to their original destinations for reuse.

BACKGROUND OF THE INVENTION

The cattle industry comprises two major components, producers and feedlots. Cattle producers raise cattle on pasture grazing land, much of which is unsuitable for cultivation. After the cattle reach a certain size, the producers send the cattle to a feedlot. A feedlot is a place where cattle are specially fed and cared for to promote further growth and improve their condition and characteristics before shipment to a packing plant for slaughter. Feedlots generally care for thousands of head of cattle or other animals in various stages of growth. These animals come from a variety of producers with widely varying previous care and feed performance history.

Cattle in feedlots are typically sorted by various criteria, such as ownership, lot number, or date of arrival. Some feedlots recently have tried sorting by other criteria, such as size, growth performance history, etc. The cattle are kept in cattle pens, with each pen typically including a feed bunk to receive feed, a water source for drinking, and usually manually operated gates to enable the animals to enter and exit the pens and in some cases be resorted. Feedlots generally also include a hospital area where individual cattle that are ill or otherwise in need of treatment can be moved to and treated before being returned to their pens. For a description of an automated feedlot sorting and electronic cattle management system that has recently been introduced in a few feedlots, see applicant's co-pending application Ser. No. 08/332,563, filed Oct. 31, 1994, which is incorporated herein by reference.

Producers have various charges assessed to them for the care and maintenance of their animals at feedlots. These charges are typically assessed by lot number at periodic intervals based on feedlot care and maintenance records. Examples of charges include feed ration charges, health care charges, growth-promotion product charges and handling charges. Assessment of changes by lot number is at best an inexact science, giving only an average approximation of the cost of feeding and caring for each animal in the lot.

To track these charges and ensure that each producer is charged the proper amount, each animal is assigned a disposable identification tag having a unique identification number that is visibly displayed on the outside of the tag to identify the lot number of the animal and/or an animal number. The identification tag is clipped to the ear of the animal by the producer prior to shipment to the feedlot, or by the feedlot when the animal arrives. In either case, the unique identification number may be entered into a database maintained at the feedlot. The database also may store the various charges associated with maintaining the lot of cattle and correlate the charges to the appropriate identification numbers and, as a result, to the proper producers.

Typically, when a lot of animals has reached its estimated optimum growth and value, or a predetermined shipping date arrives, the feedlot ships the lot of cattle (with the disposable identification tags still attached to the animals) to a packing plant for slaughter and packing. Packing plants are generally under different ownership than feedlots and maintain their own databases or other records for tracking the cattle by lot or ownership, or feedlot within the packing plant. After the cattle are slaughtered, each carcass is mounted on a trolley hook and the identification tags are removed and discarded. After processing the carcasses, the packing plant reports carcass data including grading, cost and market value data, to the feedlot.

Recently, a few feedlots and producers have begun using electronic identification tags, rather than disposable tags. The electronic tags allow for easier and more accurate tracking of the animals through the care and growth process at a feedlot. Additionally, the electronic tags may potentially allow the packing plant to match carcass data and feedlot live animal data on an individual animal basis for large numbers of animals originating from many different feedlots. Unfortunately, such electronic identification tags are expensive (e.g., approximately $8.00 apiece). In order to make the electronic identification tags commercially feasible by reducing their effective cost, the feedlots and producers must have their electronic tags returned to them from the packing plant for reuse, rather than having the packing plant discard the tags.

Unfortunately, some problems arise when the packing plants return the tags. For example, the packing plants may return identification tags to feedlots by keeping a count of how many head of cattle were received from a feedlot and then returning to the feedlot an equal number of tags. But, in such a case, the packing plant may commingle tags from multiple feedlots and redistribute the tags arbitrarily.

Feedlots and producers, however, want their original tags returned. The electronic identification tags cost approximately $8 apiece, and a typical feedlot or producer invests hundreds of thousands of dollars in tags. Like any electronic component, the tags have a limited life span, particularly because of the harsh treatment animal identification tags are subjected to. Consequently, feedlots and producers want tags collected at the packing plant to be sorted and returned to their original source. This way, feedlots and producers can protect their investment in the tags and ensure that they do not receive another feedlot's tags, which may be old, mistreated or otherwise damaged.

Currently, the only way to ensure that electronic tags are returned by the packing plant to the proper feedlot is to manually sort the tags. This requires manually reading a tag and cross-referencing the tag's unique identification number with the originating feedlot, which is burdensome, expensive and slow. As a result, the packing plants do not manually sort, and therefore, feedlots and producers are reluctant to use electronic tags. Thus, as a practical matter, currently carcass data and live animal data cannot be correlated and used to make producer and feedlot production and management decisions.

Approximately 12 million head of cattle are quartered at feedlots throughout the United States. Manually sorting 12 million tags a year would take not only an enormous amount of effort but would also be so labor-intensive and therefore expensive for the packing plant as to be unacceptable.

Accordingly, there is a need for an automated system and method for processing, sorting, and recycling electronic tags for reuse by their original users.

SUMMARY OF THE INVENTION

The present invention provides a recycling system and method enabling automatic sorting and recycling of articles having electronic information stored thereon, particularly electronic animal identification tags. The sorting system can have several modes of operation. For example, in one mode, the sorting system and method can be used to sort articles based upon ownership. In the invention, an "owner" can be the legal owner of a tag, an entity to whom the tag is leased, or any other entity controlling, possessing or using the tag, as is clear from the particular context. If the articles are electronic animal identification tags, the tags can be sorted based on which producers or feedlots own the tags. Thus, using the sorting system and method of the present invention, a feedlot or producer is ensured that their originally purchased tags are returned to them for reuse.

In a second mode of operation, the sorting system and method can count articles. For example, the sorting system can count electronic animal identification tags to ensure that a proper number of tags are received from a tag manufacturer and that the tags are not defective.

In one aspect of the invention, a plurality of misaligned and unsorted identification tags are passed through a tag aligner that aligns the tags in series. The aligned but unsorted tags are received by a tag sorter. A plurality of sorting bins are positioned adjacent the sorter for receiving tags sorted by the sorter and for storing the sorted tags. A tag reader reads the identification information from the identification tags and passes identification information stored on the tags to a controller. The controller analyzes the identification information and determines in which sorting bin a tag should be stored. When the tag is adjacent the proper sorting bin, the controller signals the sorter to eject the tag into the bin.

In another aspect of the invention, the controller includes a database that has a number field and an owner field. The number field corresponds to numbers read from the identification tags. The owner field may be used to correlate a given number in the number field to an owner in the owner field. Accordingly, using the database, each identification tag may be associated with an owner of the tag, and the tags may be sorted based upon ownership.

The tag aligner may include a vibratory bowl having an outlet chute. The outlet chute has a width approximately the size of one tag so that the tags can be aligned in series.

The sorter may be a rotating circular carousel with tag receptors positioned along the periphery of the carousel. The tag receptors are sized to receive a single tag from the outlet chute of the tag aligner. As the carousel rotates, the tag receptors align with the surrounding stationary sorting bins. The controller tracks the location of the tags on the carousel and sends a signal to the carousel to eject a tag into a corresponding sorting bin when the tag is positioned adjacent to the proper bin.

A sorting system according to the invention has been tested to sort at a rate of up to 40,000 tags per day, which is a substantial improvement over manual sorting and enables recycling of original tags to multiple cattle feeders, which heretofore has not been possible. A single operator can run the sorting system by assigning owners to sorting bins so that tags belonging to a particular owner are ejected into the proper bins. The operator can also set limits on the number of tags that are dispensed into a given sorting bin. In such a case, the controller signals the operator through a visual or auditory alarm that the sorting bin is full. The operator can then unload the bin into a plastic bag for shipping to the owner. In the event a particular owner owns a large number of tags, several bins can be assigned to that owner.

An object of the invention, therefore, is to provide a recycling system, including an automatic sorting system and method for efficiently sorting tags so that the tags may be returned to their originating feedlots and producers and recycled for use on other animals, thereby enabling the practical matching of live animal data and carcass data for individual animals originating from different feedlots.

The foregoing and other objects, features, and advantages of the invention will become more apparent from the following detailed description of a preferred embodiment, which proceeds with reference to the accompanying drawings.

BRIEF DESCRIPTION OF THE DRAWINGS

FIG. 9 shows the overall system for recycling tags.

DETAILED DESCRIPTION OF THE PREFERRED EMBODIMENTS

I. System Overview

Figure 1:
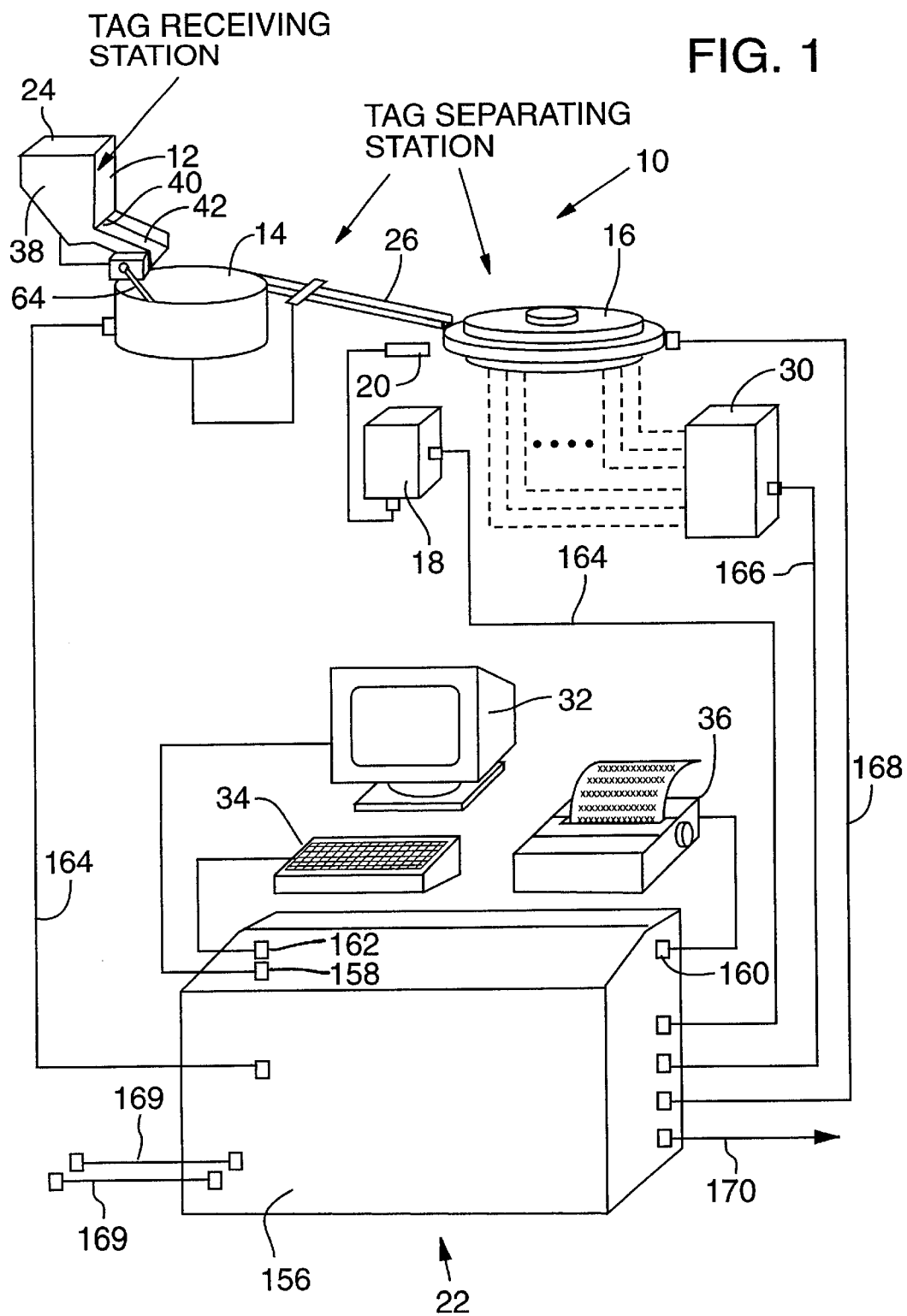
FIG. 1 is a schematic diagram of a sorting system according to the invention.

FIG. 1 illustrates a system 10 for sorting objects having electronic information stored thereon. System 10 can be used to sort a variety of objects, but is primarily intended for sorting electronic animal identification tags. The following discussion therefore primarily concerns working embodiments of systems useful for sorting such tags.

The illustrated embodiment of system 10 includes a hopper 12, a tag aligner 14, a sorter 16, a tag reader 18 which includes a reading device 20, and a controller 22. To sort identification tags, a plurality of unsorted identification tags are introduced into the hopper 12 through an opening 24. The hopper 12 feeds the tags at a controlled rate to the tag aligner 14. The illustrated tag aligner 14 comprises a vibratory bowl that orients and serially aligns the tags and delivers the tags via a chute 26 to the sorter 16. The sorter 16 comprises a rotating carousel that indexes (i.e., rotates in predetermined increments) to plural discrete positions positioned about the circumference of sorter 16. The illustrated embodiment of sorter 16 is capable of indexing to twenty-four positions. Twenty-two of the positions include sorting bins 28 (FIG. 3), one position is for receiving tags from the chute 26 (index position zero) and one position is a tag-reading station (index position one). Sorting bins 28 receive and store tags as the tags are sorted. Number designations for index positions 1–6 and 23 are shown as examples of the twenty-four index positions in FIG. 3.

After a tag is received from the chute 26, the sorter 16 indexes one position to a tag-reading station where the reading device 20 is positioned to read the tag at index position one. The reading device 20 reads information stored on the tags and transfers such tag information to the controller 22 for processing. The controller 22 analyzes the tag information by searching a database to determine if the tag information matches information stored in the database. Based on this comparison, the controller 22 determines which of the sorting bins 28 should receive the tag being read at index position one. The controller 22 tracks the position of each tag as the sorter 16 indexes. When a tag is positioned adjacent to its proper sorting bin 28, the controller 22 signals the sorter 16 to eject the tag into the sorting bin. Such signals are sent to the sorter 16 via a junction box 30.

The controller 22 also includes a user interface, including a monitor 32, a keyboard 34 and a printer 36. The user interface allows the operator to input information to the controller 22, such as, but not limited to, what mode of operation the sorting system should run in, the sorting criteria, the origin of the tags, lot numbers, lot sizes, and how many tags should be stored in a bin before the bin is considered full. The operator can also obtain a printout on printer 36 which includes a list of tags that were sorted and a label to be affixed to a container suitable for shipment that the tags are loaded in after the sorting is completed.

II. The Hopper and Tag Aligner

Figure 2:
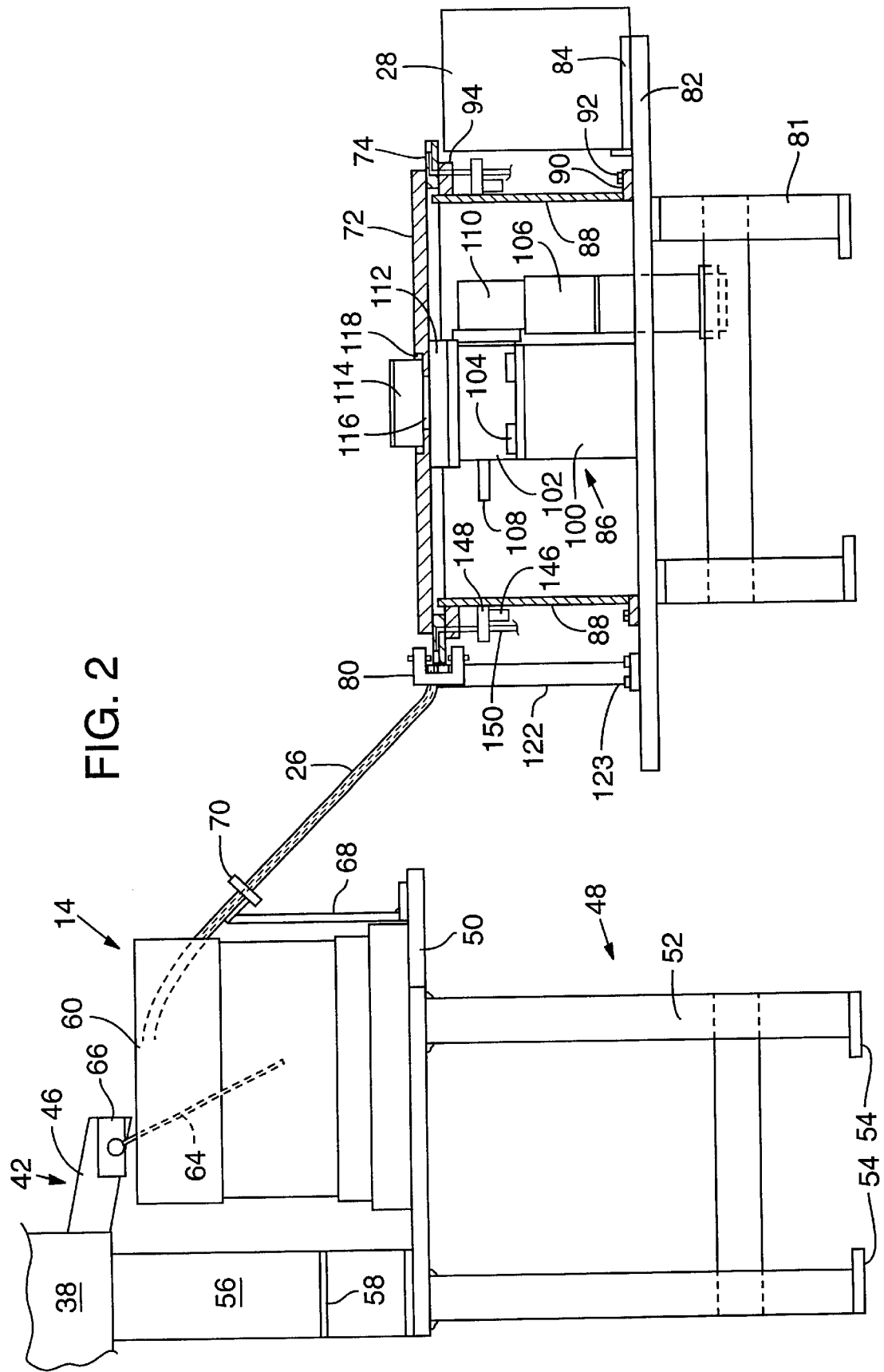
FIG. 2 is a side elevational view of a tag aligner and sorter of the sorting system of FIG. 1.
Figure 3:
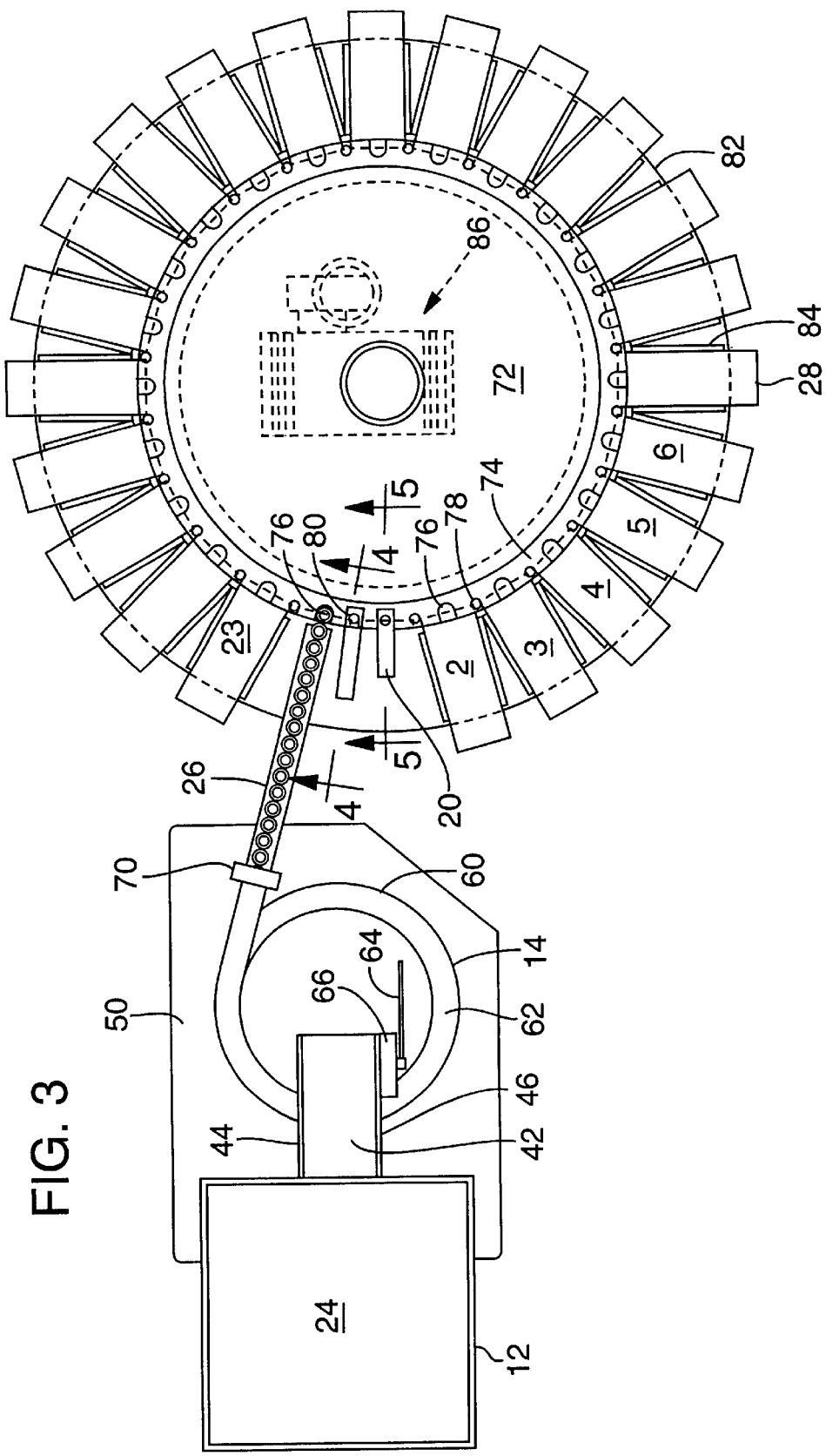
FIG. 3 is a plan view of the tag aligner and sorter of FIG. 2, the sorter including a circular carousel with a plurality of bins spaced thereabout.

Referring now to FIGS. 1, 2 and 3, the hopper 12 includes a funnel-shaped chamber 38 (most clearly shown in FIG. 1) with the opening 24 at a topmost portion thereof through which a plurality of unsorted tags are introduced. The hopper 12 also includes a smaller opening 40 at the bottom of the chamber 38 from which the tags are dispensed. A two-sided dispensing channel 42 extends outwardly and generally downwardly from the bottom opening 40 in the funnel-shaped chamber 38. Two side walls 44, 46 (FIG. 3) of the dispensing channel 42 guide the tags dispensed from the bottom opening 40 towards the tag aligner 14. The tag aligner 14 is positioned to receive tags from dispensing channel 42.

The hopper 12 and the tag aligner 14 are mounted to the top of a table 48 (FIG. 2). The table 48 includes a table top 50 and legs 52, each leg having a flanged bottom 54 to facilitate coupling the table to the supporting surface. The hopper 12 includes extension legs 56, which can be mounted to the table top 50, to elevate the funnel-shaped chamber 38 and dispensing channel 42 above the tag aligner 14. A strengthening cross-member 58 extends between the legs 56 of the hopper 12 to further support the entire structure.

Coupled to the hopper 12 is a motor (not shown). The motor vibrates the hopper 12 to expel tags through bottom opening 40 at a controlled rate and along the length of the dispensing channel 42 before the tags drop into the tag aligner 14.

The tag aligner 14 includes a vibratory bowl 60 having a track 62 (FIG. 3) spiraling around an inside wall of the bowl from the bottom of the bowl to the top thereof. At the top of the bowl 60, track 62 connects to outlet chute 26. The track 62 and the chute 26 have a width slightly larger than that of a tag. Vibrations established in the bowl 60 cause the tags to move into track 62 so that the tags are aligned in a single-file series within the track 62 and chute 26, as is shown in FIG. 3.

The tag aligner 14 also orients the tags correctly for reading by tag reader 18. More specifically, the tags have a protrusion protruding from a surface portion thereof (shown in FIG. 5 and described more fully below). The protrusion, if oriented downwardly relative to chute 26, for example, prevents the tag from sitting securely in the chute. Tags having the protrusion extending upwardly remain on the spiraling track because such tags are seated firmly within the track. Tags oriented to have protrusions extend downwardly are not seated firmly in chute 26 and are therefore knocked off of the chute by the vibrations and back into the bottom of the vibratory bowl 60.

An elongated level-sensing rod 64 (most clearly shown in FIG. 2) has one end pivotally mounted to a level-sensing control unit 66 and an opposed end that extends into the vibratory bowl 60. Control unit 66 is mounted to the side wall 46 of the dispensing channel 42. Electronic tags filling the vibratory bowl contact the level-sensing rod 64, which forces it to rotate counter-clockwise. Control unit 66 detects such rotation, and thereafter deactivates the hopper 12. As the vibratory bowl 60 gradually aligns the tags and passes the tags to the sorter 16, the level of the tags in the vibratory bowl is reduced and the level-sensing rod 64 correspondingly rotates clockwise. The clockwise rotation eventually reaches a point where reactivation of the hopper 12 occurs. Thus, control unit 66 "senses" that the vibratory bowl 60 is getting low on tags and activates the hopper 12 in response to cause more tags to be expelled from the hopper 12 and into the vibratory bowl 60.

The illustrated chute 26 extends downwardly from the vibratory bowl 60 to the sorter 16. A chute support 68 (FIG. 2) is mounted to the table top 50 to support the chute 26. The tags are forced by gravity to the base of the chute 26 adjacent to the sorter 16. Infrared sensor 70 is positioned adjacent the top of the chute 26 to detect when the tags are backed up within the chute 26. Infrared sensor 70 also is electronically coupled to the motor coupled to the vibratory bowl 60. The infrared sensor 70 can therefore deactivate the motor on the vibratory bowl 60 so as to stop the flow of tags into the chute 26. Sensor 70 reactivates the motor coupled to the vibratory bowl 60 when sensor 70 detects that more tags can be received in the chute 26.

FIG. 3 shows an example of an excess of tags serially aligned within the chute 26. The sensor 70 detects the overload condition and deactivates the vibratory bowl 60. The number of tags in the chute 26 eventually decreases so that sensor 70 is not activated by such tags. Sensor 70 then activates the vibratory bowl 60 so that more tags are delivered to and oriented correctly in chute 26. In this way, the sensor 70 monitors the number of tags in the chute 26 and controls the vibratory bowl 60 in response thereto.

III. Sorter

Sorter 16 comprises a rotating carousel 72 (FIG. 3) having a tag-receiving ring 74 positioned about its circumference. Tag-receiving ring 74 has alternating tag receptors 76 and carousel-alignment holes 78 equally spaced around the tag receiving ring 74. As illustrated in FIG. 3, ring 74 includes twenty-four tag receptors 76 and twenty-four carousel alignment holes 78. Tag-receptors 76 are U-shaped slots having an open end facing outwardly from the center of carousel 72. Tag-receptors 76 have the open end of the U-shape oriented to receive one tag as it is dispensed from chute 26. For example, FIG. 3 shows the chute 26 having a plurality of tags serially aligned therein and delivering a single tag to a tag receptor 76 at index position 0. The carousel-alignment holes 78 extend through the tag-receiving ring 74 and allow a sensing device 80 to determine whether the carousel is properly aligned as will be further described below.

Plural (twenty-two are illustrated) sorting bins 28 are spaced around the periphery of the rotatable carousel 72. Furthermore, sorting bins 28 are alignable with the tag receptors 76. As a result, twenty-two of the twenty-four total tag receptors 76 each can be aligned with a corresponding sorting bin 28. Each sorting bin 28 is removably placed on top of a circular, stationary table 82 and held in place by a low-profile mounting flange 84. The stationary table 82 has a diameter larger than the carousel 72 so that the sorting bins 28 can be positioned beyond the periphery of the rotating carousel 72.

Carousel 72 is rotatably driven by a motor 86 located beneath the center of the carousel 72. Motor 86 indexes the carousel by rotating the carousel counter-clockwise through an arc to align a tag receptor 76 with the next adjacent sorting bin, which is referred to as rotating the carousel 72 to an indexed position. The carousel 72 remains at each indexed position a sufficient period of time to allow tags positioned adjacent appropriate sorting bins 28 to be ejected into the bins, as is further described below.

As best shown in the side-elevational view of FIG. 2, the sorter 16 includes supporting legs 81 having a flanged bottom suitable for coupling the legs 81 to a supporting surface. The stationary table 82 is mounted upon the supporting legs 81. A cylindrical carousel support 88 has an annular flange 90 at the bottom thereof through which fasteners, such as bolts 92, extend to secure the carousel support 88 to the stationary table 82.

Figure 5:
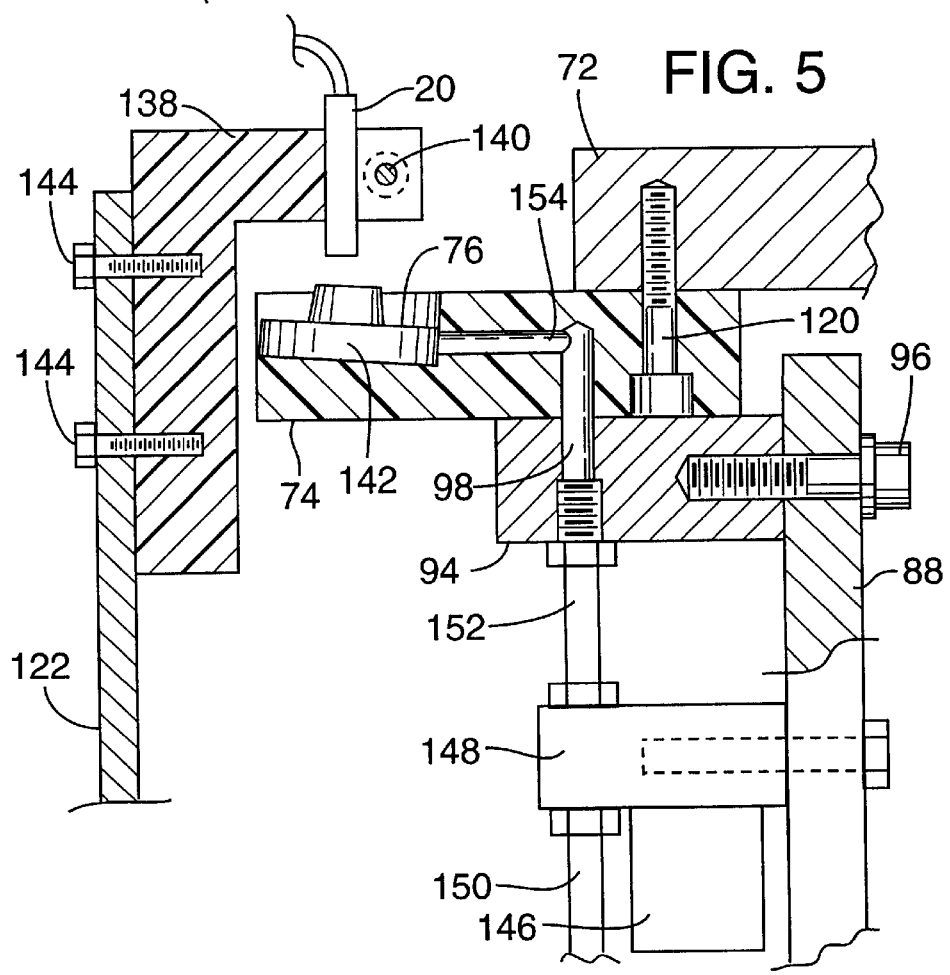
FIG. 5 shows an enlarged cross-sectional view taken along lines 5—5 of FIG. 3 of a tag reader mounted to the carousel of FIG. 3.

The carousel support 88, also includes an annular shoulder 94 at a topmost portion thereof. Turning briefly to FIG. 5, shoulder 94 is mounted at a right angle to the carousel support 88 by means of fasteners, such as screws 96. The annular shoulder 94 has a plurality of bores extending therethrough, such as bore 98, equally spaced apart and alignable with the tag receptors 76. As will be further described below, the bores 98 define fluid conduits. With the carousel 72 in an indexed position, a fluid jet, such as a jet of air, passes through bore 98 to blow a tag or tags from a receptor or receptors 76 and into an appropriate sorting bin 28.

Returning to FIG. 2, the indexing motor 86 includes a base riser block 100 mounted centrally on the stationary table 82, a base 102 having mounting brackets 104 for mounting the base to the base riser block 100, and a motor unit 106. Motor unit 106, which includes a clutch/brake mechanism (not shown), drives an oversized cam shaft 108 by means of a worm gear reducer 110. Cam shaft 108 drives a rotating dial 112 positioned centrally below the rotating carousel 72. The dial 112 is operably coupled to a cylindrical hub 114, which is positioned centrally above the carousel 72. The carousel 72 defines a centrally located bore 116 that extends through carousel 72. Carousel 72 also includes an annular recess 118 positioned adjacent to the centrally located bore 116. Hub 114 of the indexing motor is positioned within the recess 118 of the carousel 72. Fasteners, such as bolts (not shown), extend through the hub 114 and the carousel 72 and into the rotating dial 112. Thus, the dial 112, hub 114 and carousel 72 all rotate integrally together.

As is best shown in FIG. 5, the tag-receiving ring 74 is integrally connected to the bottom side and along the outside edge of the carousel 72 by fasteners, such as screws 120. The tag-receiving ring 74 slides on the shoulder 94 as the carousel 72 rotates.

IV. Carousel Alignment

The sensing device 80 is positioned adjacent the tag-receiving ring 74 by way of an extension post 122 (FIG. 2). Extension post 122 is coupled to the top surface of the stationary table 82 using fasteners, such as bolts 123.

Figure 4:
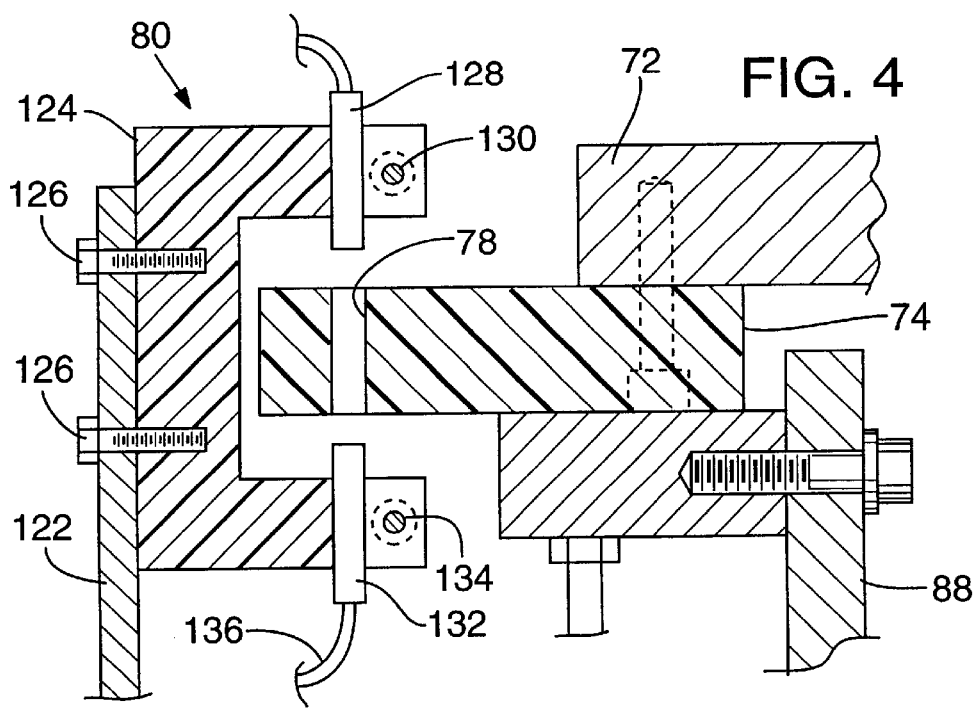
FIG. 4 shows an enlarged cross-sectional view taken along lines 4—4 of FIG. 3 of a carousel alignment device for determining whether the carousel of FIG. 3 is in proper alignment.

FIG. 4 illustrates the carousel-alignment holes 78 and sensing device 80 in detail with the carousel 72 in an indexed position. The sensing device 80 includes a C-shaped mounting member 124 secured to the extension post 122 by fasteners, such as bolts 126. A light-emitting device 128 extends through a top arm of the C-shaped mounting member 124. Light-emitting device 128 is fixed in place by a fastener 130 that clamps the device in place. A light-receiving device 132 extends through a bottom arm of the C-shaped member 124 and is aligned with the emitting device 128. Device 132 is clamped in place by the tightening of fastener 134. When carousel 72 is stopped in an indexed position, the carousel-alignment holes 78 allow the light-receiving device 132 to sense light sourced from the emitting device 128. Conductor 136 transmits signals to the controller 22 indicating whether the light beam from emitting device 128 is sensed. In each indexed position of carousel 72, the carousel-alignment holes 78 should be aligned with the light-emitting device 128 and the light-receiving device 132. If not, then carousel 72 is out of alignment and an operator is warned through a visual or auditory warning signal (not shown).

V. Tag Reader

FIG. 5 shows the tag-reading device 20 in detail with the carousel 72 in an indexed position. The tag-reading device 20 is mounted to an inverted L-shaped bracket 138 and clamped in place by fasteners 140. The reading device 20 is operably positioned adjacent the tag receptor 76 to read a tag 142 located therein. The L-shaped bracket 138 is mounted to the extension post 122 by fasteners 144. Tag-reading device 20 may be an antenna coupled to the reader 18 (FIG. 1). Working embodiments of the present sorting system have used Tiris® brand readers manufactured by Texas Instruments. It also will be apparent that tag reading devices other than the Tiris® products may be used.

The tags, such as tag 142, have a disc-like base with a protrusion extending from the top thereof. Each tag includes a transponder (not shown) mounted therein. The transponder automatically transmits a reply signal upon reception of a predetermined signal from the reading device 20. Each transponder includes a unique 64 bit number that cannot be overwritten. Additionally, a user can program a custom 80 bit wide number into the transponder. When the carousel 72 momentarily stops in an indexed position, the controller 22 (FIG. 1) sends a signal to the reader 18 asking for the unique number of a tag located at the tag-reading station. The reader 18 sends a signal over reading device 20 requesting the tag's unique identification number. The tag 142 receives the signal, and the transponder within the tag transmits its unique identification number. This number is received by reading device 20, transmitted to reader 18, and forwarded to the controller 22 for processing as will be further described below.

VI. Tag Ejection System

A working embodiment of a tag ejection system is illustrated in FIG. 5. The illustrated tag-ejection system includes a solenoid 146, a valve 148, and a fluid manifold 150. Manifold 150 is connected to a source of compressed fluid, such as a compressed air source (not shown), at one end and is threadedly coupled to valve 148 at an opposed end to provide an air-tight fit. A secondary manifold section 152 is threadedly coupled to valve 148. The bore 98 through shoulder 94 is tapped so that manifold section 152 can be threaded into the bore. With the carousel 72 in an indexed position, the bore 98 is aligned with an L-shaped bore 154 in the tag-receiving ring 74. The L-shaped bore 154 has an outlet adjacent the tag receptor 76 to blow the tag 142 out of the receptor upon activation of the valve 148. Specifically, when the valve 148 is activated by the solenoid 146, a compressed fluid passes from manifold 150, through secondary manifold 152, and through bores 98 and 154 to expel a tag from the tag receptors 76 and into an adjacent sorting bin 28. Each solenoid 146 is operably coupled to the controller 22. Controller 22 controls when tags are ejected into sorting bins 28, as is further described below.

VII. Controller

Returning to FIG. 1, the controller 22 includes a standard personal computer (not shown) mounted within an outer computer console 156. The personal computer includes an 80486 microprocessor manufactured by Intel Corp., but any microprocessor can be used, such as any processor in the 80X86-type family of Intel microprocessors or compatible processors. The controller 22 has standard output ports 158, 160 for connection to the printer 36 and the monitor 32, respectively. The output port 158 is controlled by a standard monitor card, such as those manufactured by ATI Technology, Number Nine Computer, and Diamond Multimedia Systems, Inc. An input port 162 couples the keyboard 34 to a standard input adapter (not shown), such as those manufactured by Data Technology, Inc. and Diamond Flower, Inc.

The reader 18 is coupled to the controller 22 by cable 164. The reader and controller communicate using a standard RS232 serial communication, but other communication protocols can be used.

The controller 22 is also coupled to the junction box 30 via cable 166. The junction box 30 routes individual wires within cable 166 to proper locations on the sorter 16. For example, signals from the controller 22 control the twenty-two solenoids 146 (one for each sorting bin). The controller 22 also receives signals from the junction box 30 to read the status of the sorter 16. For example, the sensing device 80 sends appropriate signals over cable 166 to provide information about the carousel's alignment. Other status information may include a low-pressure alarm if the air pressure in the manifold 150 is low, an indication that a tag 142 is present at the tag reader station, and an indication that the chute 26 is low on tags. The controller 22 may signal the operator in the case where maintenance is needed by displaying information on the monitor 32 or by lighting warning lights (not shown) mounted to the console 156.

The power and indexing control cable 168 couples the controller 22 to the indexing motor 86. The cable 168 supplies the power necessary to drive the indexing motor 86 and provides pulsed signals to control the timing on the indexing motor to rotate the carousel to the next index position in response to a pulse from the controller. Power cables 169 provide power to the console 156 and the tag aligner 14.

The controller 22 is also coupled to a second computer (not shown) via cable 170 and communicates therewith using RS232. The second computer is a database computer that stores identification tag numbers and owners corresponding to the identification tags.

The tag numbers are a 64 bit number stored on the identification tags 142. These numbers are stored in a tag number field (not shown). The tag number field is associated with a tag owner's field (not shown) so that each tag number in the database is assigned an owner. Thus, when the controller 22 receives a tag number from the reader 18, the controller can determine the owner of the tag and control the sorter 16 to properly sort the tag based on ownership, as will be further described below.

The console 156 and the tag database computer operate in a client/server relationship. The console (client) requests information or action from the tag database computer (server), which in turn provides the service requested. All transactions are initiated by the console. Since there is a one-to-one correspondence to each message sent, flow control (XON/XOFF, ENQ/ACK, or hardware handshaking) is not required.

The format for each message transmission is:

<message text><checksum><CR+LF>

Data transmitted over the link uses standard ASCII characters.

Each transmission is terminated with a checksum followed by a carriage return and line feed. The checksum is computed by making a simple modulo 256 sum of each character in the transmission (not including the terminating carriage return and line feed). The result is then converted to two ASCII characters representing a hexadecimal value.

Each transaction is acknowledged by the recipient to indicate proper reception. The acknowledgment contains the characters "ACK" if the message and checksum were valid or "NAK" if there was an error in reception. The "ACK" or "NAK" message terminates with a carriage return and line feed. The checksum characters are required in an acknowledgment message. If the console 156 is the sender and it receives a "NAK" message or does not receive an acknowledgment to a transmission within a reasonable amount of time, the message is retransmitted. If repeated efforts fail, the sorting process is terminated. If the tag database computer is the sender, no retransmission is attempted since the console repeats the transmission after a time-out period has elapsed.

The following messages are defined for the tag-sorter-to-tag-database interface. The messages are initiated by the tag sorter and are responded to by the tag database when required.

A start request message is sent to the tag database computer to request permission to start sorting. The format for the start request is as follows:
START or START TEST If the tag database computer is ready to support sorting, it responds with a "READY" message. If the tag database computer is not ready to sort, a "NOT READY" message is sent. The START TEST request is used to tell the tag database computer that the tag sorter is in a test mode. The tag database computer should not record any transactions while in the test mode.

An EID (electronic identification) lot request is a message sent to the tag database computer to request the lot number for a given tag. The message has the following format:
EID <eidNumber>

The response to the EID lot number request is as follows:
EID <eidNumber>,[LOT]<lotNumber>[,FULL][,REREAD]

The "FULL" indicator is used to tell the console 156 that this is the last tag for this lot number. This indicator will cause the tag sorter to tell the operator to dump the bin containing this lot after there are no more tags for this lot.

If the EID tag number is not found in the tag database computer, a lot number of zero will be returned to the sorter to indicate that the tag is from an unknown owner.

An EID tag sorted message is sent to the tag database computer to tell it that the specified tag number will be sorted and sent to a sort bin. The message has the following format:

SORTED<eidNumber>,<lotNumber>

There is no response to the EID sorted message (other than the normal acknowledgment).

An EID tag bypassed message is used to tell the tag database computer that the specified tag number was bypassed and not sorted (sent to the overflow bin). The message has the following format:

BYPASSED <eidNumber>

There is no response to the EID bypassed message (other than the normal acknowledgement).

A lot information request is sent to the tag database computer to request information about the specified lot number. The format for the lot information request message is as follows:

LOT<lotNumber>

The response to the lot information request is as follows:

LOT <lotNumber>,[OWNER]"<lotOwner>", [COUNT]<numberOfTagsinLot>[,FULL]

The lot owner is a character string used to identify the owner of the requested lot number. The number of tags in lot count is for informational purposes. It indicates the number of tags currently in the lot at the time the lot request was made. The "FULL" indicator is used to tell the tag sorter that this lot has been previously completed. This indicator causes the tag sorter to tell the operator to dump the bin containing this lot after there are no tags for this lot on the sorter dial.

A lot dumped message is used to tell the tag database computer that the specified lot number has been dumped. The contents of the lot should be verified if required. A lot report and label should also be printed. The format for the message is as follows:

DUMPED <lotNumber>

There is no response for the lot dumped message (other than the normal acknowledgement).

A stop message is used to tell the tag database computer that the tag sorter has stopped sorting. The format for the stop request is as follows:

STOP

No response is required for the stop message (other than the normal acknowledgement).

VIII. Operation of Sorting System

Figure 6:
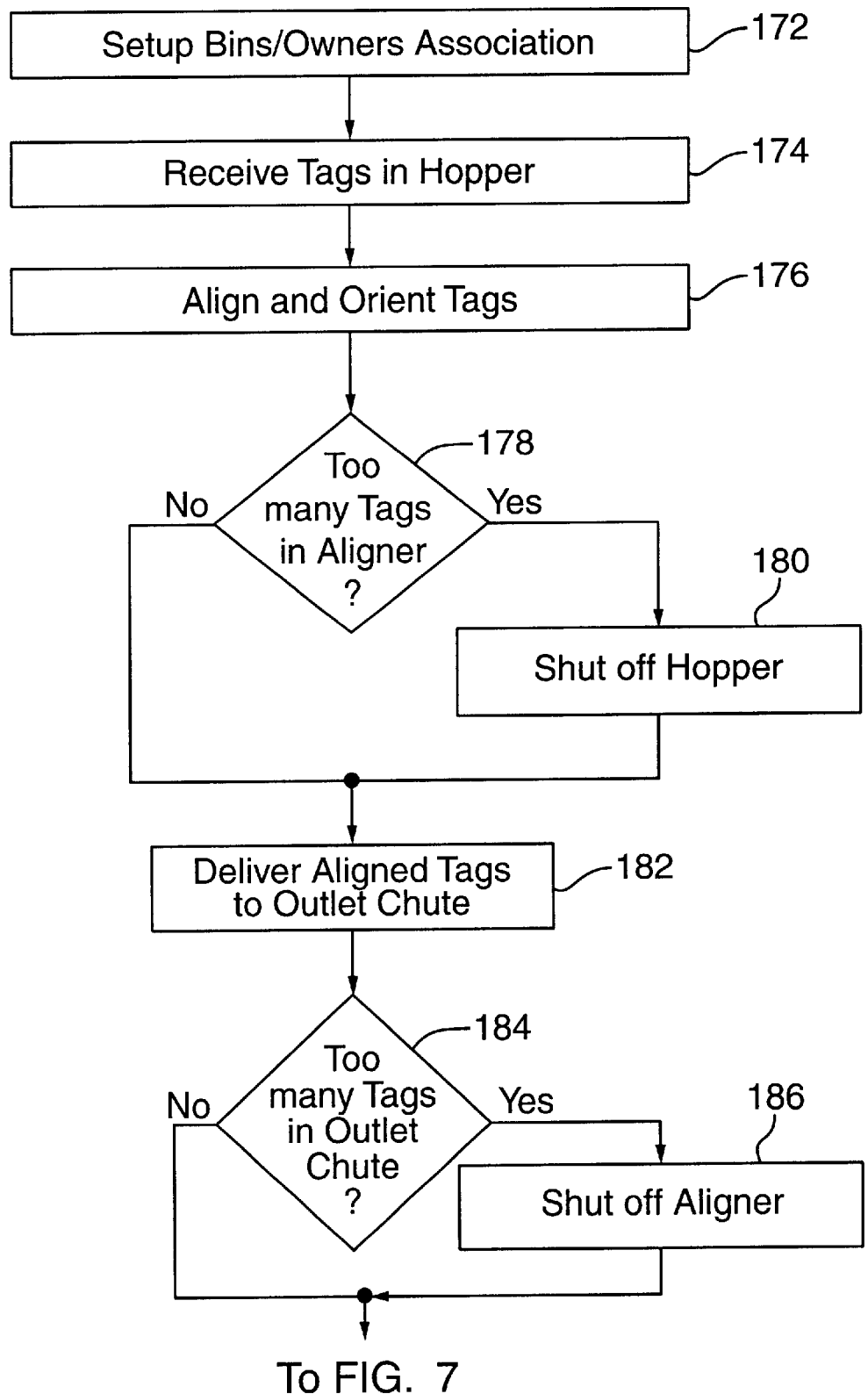
FIG. 6 is a flow chart showing the steps taken by a hopper for receiving tags and a tag aligner for aligning tags from the hopper.

FIG. 6 is an operation flowchart for the sorting system 10. In step 172 an operator inputs information using keyboard 34 to match each of the sorting bins 28 to a particular owner. For example, a bin at the second index position may be assigned to owner A, while a bin at the third index position may be assigned to owner B. If a particular owner has a large number of tags to be sorted, more than one sorting bin can be assigned to that owner. Additionally, some bins 28 can be assigned as overflow bins so that if a tag does not correspond to any owner assigned to a bin, the sorter 16 ejects the tag into the overflow bin.

In step 174 a group of unsorted tags are introduced into the hopper 12. The operator then starts the motor to vibrate the hopper. The motor also may be automatically triggered upon sensing that tags are within the hopper 12. The tags are dispensed at a controlled rate out of the dispensing channel 42. The rate may be controlled by adjusting the rate at which the hopper is vibrated.

In step 176 the tags are aligned in series and are oriented top-side up by the tag aligner 14. The vibrating motor of the tag aligner 14 forces the tags up the spiraling track 62 where they are delivered to the output chute 26 or, if not properly oriented, are forced back to the bottom of the vibratory bowl 60.

In step 178, the tag aligner 14 uses the level-sensing rod 64 to detect when too many tags are in the vibratory bowl 60 and shuts off the hopper in response thereto (step 180). In any event, the tags are delivered to the chute 26 (step 182) where the tags are forced by a gravity feed to the sorter 16.

In step 184, the infrared sensor 70 located along the chute 26 detects-if there are too many tags in the chute and shuts off the aligner 14 (step 186) to prevent an overflow of tags within the chute.

Figure 7:
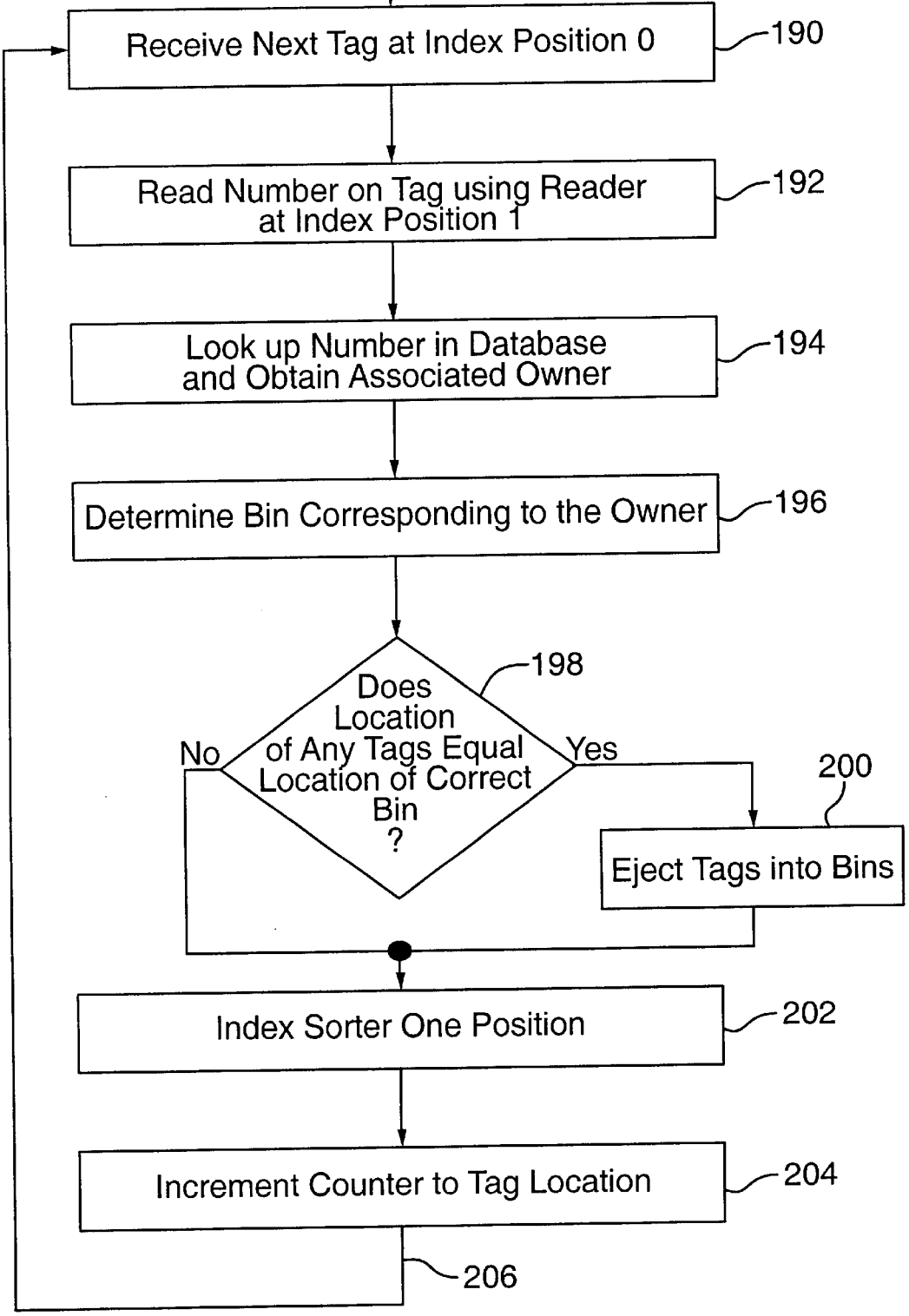
FIG. 7 is a flow chart showing the steps taken by a controller to control the sorter of FIG. 3.

FIG. 7 is a flowchart showing the steps taken by the system 10 for receiving a tag 142 from the chute 26 and delivering the tag to the proper sorting bin 28. In step 190, the next tag aligned seriatim in the chute 26 is received by the sorter 16 at index position zero.

In step 192, a tag positioned at the reading station (index position 1) is read using reading device 20. Specifically, the controller 22 sends a signal to reader 18 over cable 164. The reader 18 in turn sends a signal over reading device 20. The tag located at index position 1 responds to such a signal by transmitting its unique tag number. The reading device 20 receives the number and transmits it to reader 18, which forwards the tag number to controller 22.

In step 194 the controller 22 uses a database containing a number field and a corresponding owner field. The tag's unique identification number is searched in the database to find a matching number in the number field. Once a match is found, the corresponding owner in the owner field represents the owner of the tag.

In step 196 the controller 22 determines the sorting bin corresponding to the owner of the tag at the reading station. This information was entered by the operator in step 172 (FIG. 6). At this point, the tag's index position (i.e., index position 1) and the proper sorting bin's index position are known. The carousel must now be rotated one position at a time until the tag is aligned with the proper sorting bin.

In steps 198, the controller checks to determine which tags are aligned with proper sorting bins. For each tag that is properly aligned with its sorting bin of final destination, the controller 22 sends a signal over cable 160 to activate the solenoids 146 corresponding to those index positions (step 200). As described above, activation of the solenoids 146 causes high-pressure fluid to flow through bore 98 in shoulder 94 and bore 154 in tag receiving ring 74 to blow the tags 142 into the sorting bins 28. In the illustrated embodiment, there are twenty-two sorting bins 28 and, consequently, twenty-two tags 142 can be blown into the bins simultaneously, one tag per bin if the twenty-two tags are properly positioned adjacent appropriate sorting bins. After the tags 142 are ejected into the bins 28, the controller 22 sends a pulsed signal over cable 168 that causes the motor 86 to index the carousel 72 one index position (step 202).

In step 204, the controller 22 increments twenty-four counters (not shown). Each counter represents the index position of a tag. Using these counters, the controller can determine when the index position of a tag is equal to the sorting bin index position into which the tag should be ejected. As indicated by arrow 206, after all the counters have been updated so that the tags are being properly tracked, the cycle repeats.

The system 10 can also be used to count new tags received from a tag manufacturer and to verify that database numbers corresponding to the tags are accurate. When new tags are received, the manufacture generally provides a list (on floppy disk or some other electronic medium) of identification numbers corresponding to the tags. The list is loaded into the system database. An operator can then put the system 10 in a "count mode" for verifying the accuracy of the list and the amount of tags received. The tags are introduced into the hopper 12 and counted by the sorter 16. The accuracy of the database is checked to ensure that the numbers in the list correspond with the numbers on the tags.

IX. Overall Method and System

Figure 8:
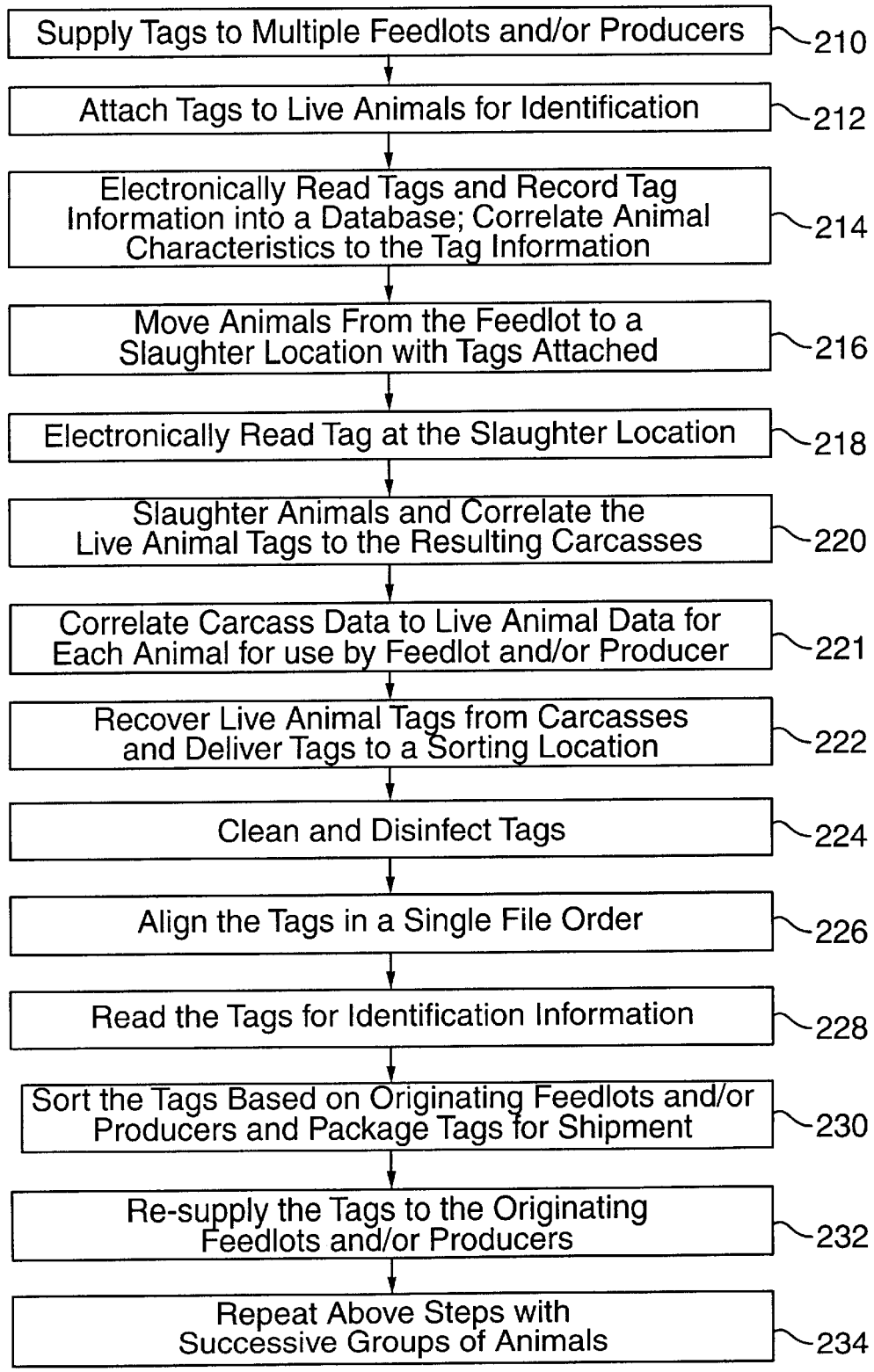
FIG. 8 shows the overall method for recycling tags.

FIG. 8 shows the overall method 208 for recycling tags. In step 210, identification tags are supplied to multiple animal feeders, such as feedlots and/or producers. The animal feeders attach the tags to the live animals (step 212) to uniquely identify the animals. At the feedlots, the identification tags are read and identification information stored on the tags is stored in a computer database (step 214). Animal characteristics, such as lot number, date of arrival, size, and growth performance history, may also be entered in the database and matched to the identification information stored on the tags to accurately track the animal characteristics.

After reaching their optimum growth and value, the feedlot moves the animals (with the identification tags still attached) to a slaughter location (e.g., a packing plant) for slaughter and packing (step 216). The tags are electronically read at the slaughter location (step 218) and after an animal is slaughtered, the identification tags are correlated to carcass identification numbers, such as a number of a trolley hook that the carcass is mounted on (step 220). This allows carcass information for each carcass to be matched on a one-to-one basis with the live animal. Thus, information obtained from the packing plant can be correlated with live animal information stored in the database at the feedlot for use by the feedlots and producers in making future breeding, selection, sorting, slaughter and other decisions, for example, relevant to meat production.

In step 222, the tags are removed from the animals and placed in large bins that hold a large number of unsorted tags belonging to multiple feedlots and/or producers. Rather than discarding the tags, the tags are delivered to a sorting location for recycling. The tags are cleaned and disinfected at the sorting location or elsewhere (step 224).

The tags are fed into a hopper and aligned in single file order (step 226) using a tag aligner. There are many mechanical or other ways to align tags known in the art, with the described vibratory aligner being but one example, and the invention should not be limited to a particular type of aligner used. In step 228, the aligned tags are electronically read and the electronic information stored on the tags is matched to information stored in a computer database. The computer decides, based on the tag information, in which bin to sort the tag (Step 230). The tags are sorted and packaged based on the originating feedlot and/or producer to which the tags are to be delivered. Defective tags may be stored in separate bins so they may be discarded or repaired.

In step 232, the tags are re-supplied to the originating feedlots and/or producers. In this way, the tags are recycled and the originating feedlots and/or producers can receive their original tags back for reuse. The tags are then reattached to live animals and the cycle is repeated (step 234). Thus, using this method, the tag's real cost may be reduced from approximately $8.00 per use (the cost of a new tag) to $1.00 per use, since the tag may be used over and over again many times during an approximately five year life span of the tags.

In summary, the method has the following steps:

a. attaching an automatically readable identification device to an animal, automatically reading the device and entering such identification into a computer at a user location;

b. recording data associated with the identified animal in the computer during the course of feeding the animal in preparation for slaughter;

c. maintaining accumulated data recorded for the identified animal in the computer during feeding of the animal in preparation for slaughter;

d. selecting the identified animal for shipment to the slaughter location and moving the animal to the slaughter location while maintaining the identification device attached to the animal and while maintaining the live animal data in the computer storage;

e. automatically reading the identification device from the identified animal at the slaughter location and matching the identification of the live animal to the corresponding carcass identity;

f. recording the identification of the slaughtered animal in a computer system at the slaughter location; also recording carcass data concerning the identified and slaughtered animal at the slaughter location;

g. removing the identification device from the animal at the slaughter location and placing it in a storage container;

h. removing the storage container holding a plurality of identification devices to a sorting location;

i. removing the identification devices from the container and cleaning said devices at the sorting location;

j. automatically reading the identification devices at the sorting location;

k. placing multiple identification devices with multiple different user identifications in an automatic reading and sorting system;

l. in response to automatically reading an identification device by the sorting system, entering such identification in the computer;

m. matching the identification of the individual identification device with a user identification for that identification device by using a computer;

n. automatically and physically sorting by computer control each of the identification devices into containers corresponding to the correct user identification;

o. maintaining, by computer control, a count of the number of identification devices sorted into each container;

p. accumulating, by computer control, a predetermined number of identification devices into the container and stopping the placement of devices in that container when that predetermined number is reached;

q. removing the container from the sorting system after it has reached its predetermined number of devices;

r. identifying the container by user identification and recording the user identification and the device group identification into the computer;

s. storing the devices and maintaining in the computer the device records in an inventory record;

t. removing the devices from storage and shipping the devices to the user location by user identification in the computer and recording the identified devices shipped in the computer;

u. deducting the shipped identification devices from the inventory in the computer at the shipping location;

v. receiving the identification device shipment at the user location;

w. attaching the identification device to a different animal than previously attached, automatically reading the device and entering such identification into the computer at the user location;

x. sorting identification devices with the said automatic reading and sorting system into an identified container when no user identification is found in the computer for such identification device;

y. when a user can be identified, entering into the computer such user identification corresponding to the said device;

z. after entering such user identification, placing the said device(s) into the automatic reading and sorting system and then automatically and physically sorting by computer control each such device into a container corresponding to the correct user identification for that device in the computer.

The foregoing process, through each cycle of use, facilitates the matching of carcass data with live animal data on an individual animal basis. Such data can then be analyzed by producers and feedlots as an aid in making future animal purchase, breeding, selection, sorting, feeding, slaughter, pricing and other marketing and management decisions.

FIG. 9 shows the overall sorting system 236 for carrying out the recycling process described in FIG. 8. After the tags are cleaned and disinfected, they are feed into a hopper 238. The hopper 238 transfers the tags to the tag aligner 240. Many different types of aligners can be used, but, preferably, the tag aligner places the tags in a single-file order.

A reader 242 electronically reads the aligned tags to obtain electronic information (e.g., an identification number) from each tag. The reader 242 can read the tags once the tags are at a sorter 246 or prior to delivery to the sorter, such as while being fed to the sorter. In either case, the electronically read information is passed to a controller 244 for processing. The controller 244 determines how to control a sorter 246 so that the sorter distributes the tags in one of the sorting bins, shown generally at 248. Once the tags are received in the proper sorting bin, they can be delivered to the originating feedlot or producer for reuse. Thus, the feedlots or producers are ensured that they will receive their original tags, and not tags owned by other feedlots or producers.

Having illustrated and described the principles of the invention in a preferred embodiment, it should be apparent to those skilled in the art that the embodiment can be modified in arrangement and detail without departing from such principles.

For example, although the sorter is shown as a rotating carousel, the sorter can also have a different structure and operating components. For example, the sorter might be a linear sorter including a moving belt that carries the tags in a line past the sorting bins, with wipers or other devices to divert selected tags into selected bins alongside the belt. Many ways of sorting are known in the art and may be used.

Additionally, although the tags carry a number corresponding to an owner, the tags may instead contain the actual name of the owner. This way, the controller only needs to determine which bin a given owner corresponds to in order to sort a tag.

Furthermore, although the controller is shown as a console computer and a separate database computer, these may be combined into a single computer.

Still further, although the ejection system is shown as a jet of air, other ejection systems may be used as is well known in the art.

Yet still further, although the electronic tags store electronic information and communicate that information using a transponder, electronic information can also be stored using labels, including optionally read labels, such as universal product codes (UPCs). Other ways to store electronic information on tags are also well known in the art.

In view of the many possible embodiments to which the principles of our invention may be applied, it should be recognized that the illustrated embodiment is only a preferred example of the invention and should not be taken as a limitation on the scope of the invention. Rather, the invention is defined by the following claims. We therefore claim as our invention all such embodiments that come within the scope of these claims.

I claim:

1. A method of recycling electronic identification tags, comprising:

supplying a plurality of electronic identification tags to multiple animal owners;

attaching the identification tags to live animals for identification at a feeding location;

electronically reading an identification number from each identification tag attached to an animal and entering the animal's characteristics into a database record associated with the identification number;

moving the animals from the feeding location to a slaughter location;

matching the identification numbers on the identification tags to carcasses resulting from slaughtering the animals;

removing and cleaning the identification tags;

aligning the identification tags in a single-file order;

automatically reading the identification tags to obtain the identification numbers stored thereon;

determining a destination location for each identification tag;

automatically separating the identification tags based on destination so that identification tags to be sent to one animal owner are separated from identification tags to be sent to other animal owner; and re-supplying the identification tags to the multiple animal owners so that each animal owner is supplied the same identification tags it was originally supplied.

2. A method of recycling electronic identification tags, comprising:

supplying a plurality of electronic identification tags to multiple identified animal tag users;

attaching the identification tags to live animals for identification at a tag user location;

electronically reading an identification number from each identification tag attached to an animal and entering the animal's characteristics into a database record associated with the animal identification number;

moving the animals from an identified animal tag user's feeding location to a slaughter location;

matching the identification numbers on the identification tags to carcasses resulting from slaughtering of the identified animals;

removing and cleaning the identification tags;

aligning the identification tags in a single-file order;

automatically reading the identification tags to obtain the identification numbers stored therein;

determining a tag user identification destination for each identification tag;

automatically separating the identification tags based on tag user identification so that identification tags to be sent to one tag user are separated from identification tags to be sent to other tag users; and re-supplying the identification tags to the multiple animal tag users so that each tag user is supplied the same identification tags it was originally supplied.

3. A method of recycling identification tags, comprising:

providing a plurality of live animals having attached electronic identification tags, each of the identification tags having a unique identifier specifying an associated animal owner;

at a first location, electronically reading the unique identifiers from at least some of the identification tags while the identification tags remain attached to the animals;

for each unique identifier that has been read, entering characteristics of the respective animal and storing the characteristics as a record in a database;

periodically updating the database with changes to the characteristics;

allowing the animals to move from the first location to a second location in any order;

at the second location where the animals are slaughtered into carcasses, electronically reading the unique identifiers from the identification tags and storing in the database respective carcass numbers in association with the unique identifiers;

removing the identification tags from the carcasses;

automatically sorting a group of the removed identification tags provided in any order by electronically reading each unique identifier and accessing the database to determine the animal owner associated with the read unique identifier, and separating the identification tags according to each respective animal owner; and returning the sorted identification tags to the respective owners.

4. The method of claim 2, further comprising using the database to reconcile inventory of identification tags based on a selected animal owner.

* * * * *